United States Patent
Roeloffs et al.

(10) Patent No.: US 6,634,858 B2
(45) Date of Patent: Oct. 21, 2003

(54) GAS TURBINE AIRFOIL

(75) Inventors: Norman Roeloffs, Tequesta, FL (US); Samuel Miller, Port St. Lucie, FL (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/877,073

(22) Filed: Jun. 11, 2001

(65) Prior Publication Data

US 2002/0197161 A1 Dec. 26, 2002

(51) Int. Cl.⁷ .................................. F01D 5/18
(52) U.S. Cl. ........................ 416/97 R; 29/889.721
(58) Field of Search ..................... 416/96 R, 97 R; 415/115; 29/889.721

(56) References Cited

U.S. PATENT DOCUMENTS

| | | |
|---|---|---|
| 4,148,350 A | 4/1979 | Rossmann |
| 4,236,870 A * | 12/1980 | Hucul et al. .......... 416/97 R X |
| 4,786,233 A | 11/1988 | Shizuya et al. |
| 5,140,127 A * | 8/1992 | Stroud et al. ............ 219/121.7 |
| 5,243,759 A | 9/1993 | Brown et al. |
| 5,403,159 A | 4/1995 | Green et al. |
| 5,773,790 A | 6/1998 | Moore et al. |
| 5,813,835 A | 9/1998 | Corsmeier et al. |
| 6,092,991 A | 7/2000 | Tomita et al. |
| 6,481,967 B2 * | 11/2002 | Tomita et al. ............ 416/97 R |
| 6,491,496 B2 * | 12/2002 | Starkweather ............ 416/97 R |
| 2002/0110454 A1 * | 8/2002 | Tiemann ................... 416/97 R |

* cited by examiner

Primary Examiner—Edward K. Look
Assistant Examiner—Richard A. Edgar
(74) Attorney, Agent, or Firm—Burns, Doane, Swecker & Mathis, L.L.P.

(57) ABSTRACT

An airfoil includes internal cooling air passages arranged in a serpentine manner with one or more radially outward and radially inward extending passages. The passages are in fluid connection through turns of approximately 180°. The turns near the platform of the airfoil connecting a radially inward extending passage with a radially outward extending passage are realized by a root turn defined by the passage sidewalls, which extend radially inward to the radially inner end of the root section of the airfoil, and by an end plate attached to the radially inner ends of the walls.

4 Claims, 3 Drawing Sheets

GAS TURBINE AIRFOIL

FIELD OF THE INVENTION

This invention relates to a gas turbine airfoil with internal serpentine passages for cooling purposes.

BACKGROUND OF THE INVENTION

Turbine airfoils are subjected to the very high temperatures of the hot gas driving the turbine. In order to prevent damage to the airfoils due to the high temperatures and assure a reasonable lifetime the airfoils are cooled externally and internally by a cooling medium, typically cooling air bled from the compressor of the gas turbine. Internal cooling of the airfoil is realized by several passages within the airfoil between the pressure sidewall and the suction sidewall of the airfoil. The passages typically extend spanwise from the root of the airfoil to its tip. Some of the passages consist of a single passage with an exit port near the tip of the airfoil and/or several film cooling holes on the edge or on the side wall of the airfoil. Other passages follow a serpentine path allowing the cooling air to flow for example from the root to the tip and around a 180° turn. From the tip it extends towards the root and around a further 180° turn that directs it again toward the tip where it finally exits through exit ports or film cooling holes. Serpentine cooling passages of this type are disclosed for example in U.S. Pat. No. 5,403,159. They allow for a high internal heat transfer with a minimum amount of cooling air.

FIG. 1 shows a radial cross-section of a typical airfoil 1 of the state of the art with several internal passages extending radially inward and outward between a root section 2 and a tip 3. A first internal passage 4 extends from an entry opening 5 in the root section 2 radially outward to the tip 3 of the airfoil. Cooling air can flow from the root section 2 through the passage and exit via several cooling slots 6 along the trailing edge 7 as well as through a tip hole 8. A second internal passage 10 extends from an entry opening 11 radially outward along the leading edge 12 of the airfoil. Cooling air flows through this passage 10 and exits via a tip hole 13 and through several rows of film cooling holes 31 drilled through the leading edge 12 of the airfoil. A serpentine passage comprises an entry opening 14 at the radially inner end of the root section, a first passage 15a extending radially outward with a tip hole 17. At the tip a 180° turn 16 leads to a passage 15b extending radially inward. At the radially inner end of the passage a second 180° turn 18 leads to a third passage 15c extending radially outward to a tip hole 19. Cooling air flowing through the straight and serpentine passages cool the airfoil from within by impingement cooling and exits through the film cooling holes on the edges of the airfoil 1 and/or through the tip holes. Other typical airfoils have several serpentine cooling passages or serpentine passages comprising five passages with four turns.

Airfoils with internal serpentine geometry for the cooling passages are typically manufactured by an investment casting process, which utilizes a ceramic core to define the individual internal passages. Following the casting the ceramic core is removed from the airfoil by a leaching process. The film cooling holes on the edges and sidewalls of the airfoil are then realized by a laser drilling process. This process involves, previous to the actual drilling, the insertion of a backing or blocking material which limits the laser radiation to the desired locations of the film cooling holes and prevents damage to the passage walls and other inner surfaces of the airfoil. Such a method is disclosed for example in U.S. Pat. No. 5,773,790. It uses a wax material as a blocking material.

During the process of casting the internal passages it is often difficult to maintain the separation of the passages in the cores due to thermal strains caused by differential heating and cooling rates of the core and surrounding metal.

A current practice to maintain the separation of the serpentine passages 15a,b,c and to support the core during the casting process utilizes conically shaped features in the core. These conical features are formed as part of the core and extend from the root section through an opening in the wall of the 180° turn 18 and into the passages 15b and 15c. After the part is cast and the core is leached out, the conical feature is closed off with a spherically shaped plug 30 that is brazed into place.

The conical feature maintains a near constant cross-sectional area and outer radius of the outer wall through the 180° turn in order to minimize pressure loss. Typical measured pressure losses through the turns are usually >1.5 times the dynamic pressure of the cooling air stream entering the turn.

However, the conical feature presents a weak spot in the core where it can break resulting in movement of the passages 15b and 15c, the turn 18, and the root section of the passage 15a.

Following the casting process and the leaching out of the core material, a backing material must be inserted into the cooling passages for the laser drilling of film cooling holes.

As the passages 15b and 15c following the 180° turns are not easily accessible from either end, it is difficult to fill these passages with backing material. In current practice this problem is circumvented with the use of a liquid wax, which is typically hot injected into the opening 14 until wax is seen exiting from the tip hole 19. After the completion of the laser drilling, the waxen backing material is removed from the airfoil by heating the airfoil and burning the wax. This practice has shown however, that the use of wax as a backing material does not sufficiently absorb the laser energy, and therefore provides only limited protection from so-called back wall strike.

SUMMARY OF THE INVENTION

This invention provides an airfoil and a method of manufacturing the airfoil that comprises internal cooling fluid passages arranged in a serpentine path having one or more radially outward extending passages and one or more radially inward extending passages, which are connected by turns of approximately 180°. In particular, the invention provides an airfoil and a method of manufacturing such an airfoil that enables improved maintenance of the passage separation during casting and the use of a blocking material for a laser drilling process that provides greater shielding compared to the blocking material used in current manufacturing methods.

An airfoil comprises internal cooling air passages arranged in a serpentine manner having one or more radially outward extending passages and one or more radially inward extending passages, and turns of approximately 180° providing fluid connection between a radially inward and a radially outward extending passage. A radially inward extending passage in a serpentine passage is defined by the inner surfaces of the pressure and suction sidewalls of the airfoil. A first wall and a second wall separate the radially inward extending passage from neighboring passages. A radially outward extending passage in a serpentine passage following the radially inward extending passage in the fluid flow direction is defined by the inner surfaces of the pressure and suction sidewalls of the airfoil, the second wall, and a third wall. The third wall can be a separating wall to a further cooling passage or the leading or trailing edge wall of the airfoil.

According to the invention, each radially inward extending passage is in fluid connection with the next radially outward extending passage in the direction of the cooling fluid flow by means of a root turn. This root turn is defined by the first wall of the radially inward extending passage and the third wall of the radially outward extending passage, which both extend to the radially inner end of the root section of the airfoil. The root turn is further defined by a member that closes off the root turn at the radial inner end of the root section of the airfoil and is attached to the radially inner ends of the first and third walls of the passages.

The radially inward extending passage and the radially outward extending passage are thus combined below the airfoil platform. There is therefore no need for a curved outer wall for a turn at the level of the airfoil platform. This geometry for an airfoil avoids a 180° turn with a curved side wall and avoids the necessity of a hole for insertion of the conical features and the subsequent closing of the hole with a ball braze.

In a method for manufacturing the airfoil according to the invention, a ceramic core is used for the casting of the internal passages between the pressure and suction sidewalls of the airfoil. The ceramic core forms the root turn at the radially inner end of the root section of the airfoil in the casting process. Following the casting process, the ceramic material making up the core is leached out of the cast airfoil. Thereafter, strips of a thermoplastic resin sold under the trademark Teflon™ m are inserted into the passages, and film cooling holes are drilled. During the drilling process the Teflon™ strips protect the surrounding cast material from the laser radiation. After the drilling process the Teflon™ strips are removed and a member is placed at the end of the root turn in order to close it off.

During the casting process the root turn is open-ended, allowing good access for the application of additional core supports in the region of the turn. This provides improved control over the wall separation and the location of the turn. Following the casting process and removal of the core, the open turn enables excellent access for the insertion of a backing material necessary to perform the laser drilling of film cooling holes.

This backing material is not necessarily fluid such as a waxen material, but instead can be made of a stiffer material such as strips of Teflon™ (PTFE). Teflon™ provides an improved shielding compared to the waxen material used in current practices. Following the laser drilling process the Teflon™ strips are again easily removed, after which each root turn is closed off with a member such as an end plate welded or brazed to the radially inner ends of the sidewalls of the serpentine passages combined by the root turn.

Furthermore, the open root turns enable an improved leaching out of the core material after the casting process.

DETAILED DESCRIPTION OF THE INVENTION

Figure 1:
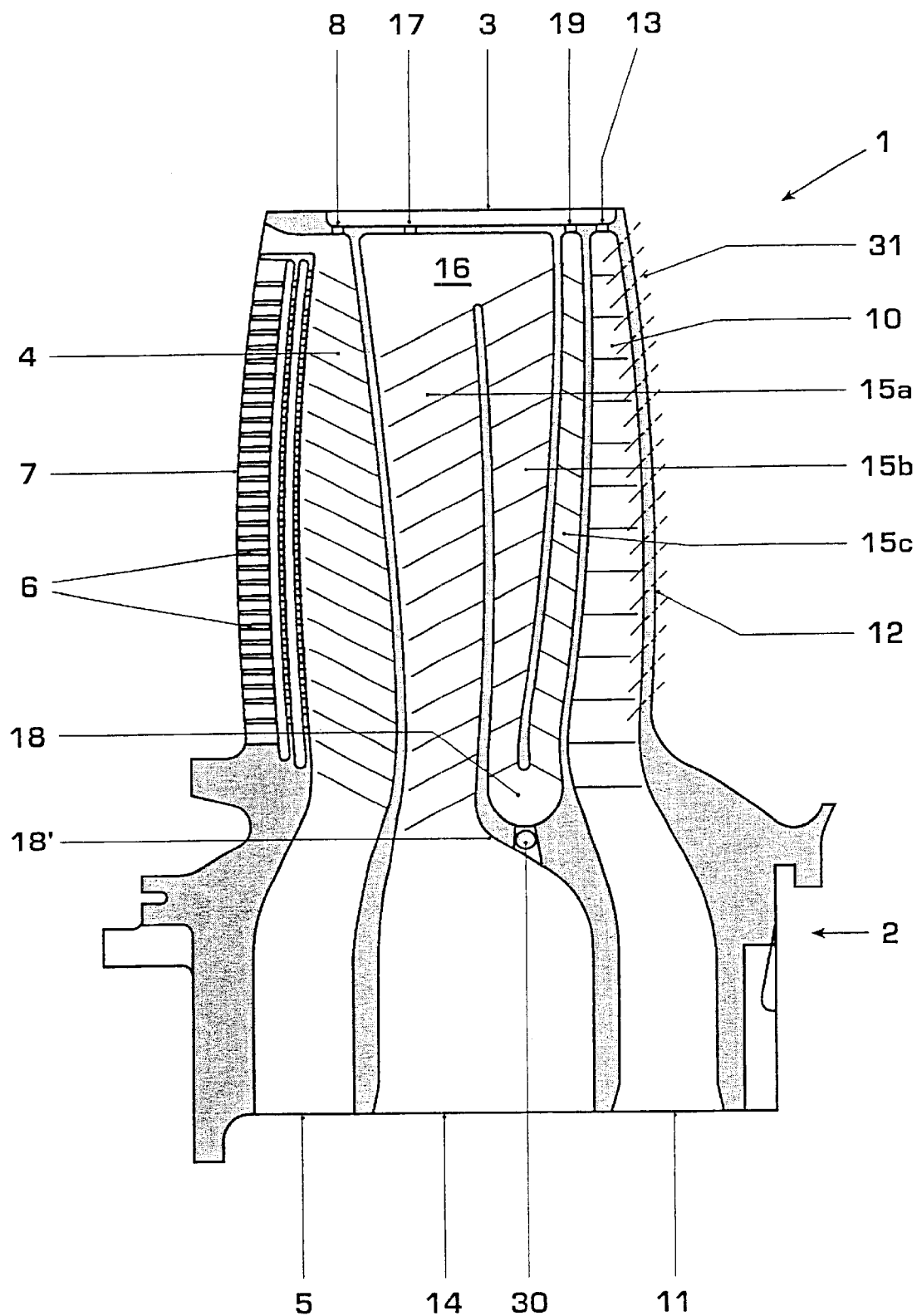
FIG. 1 shows a spanwise cross-section of a conventional airfoil.
Figure 2A:
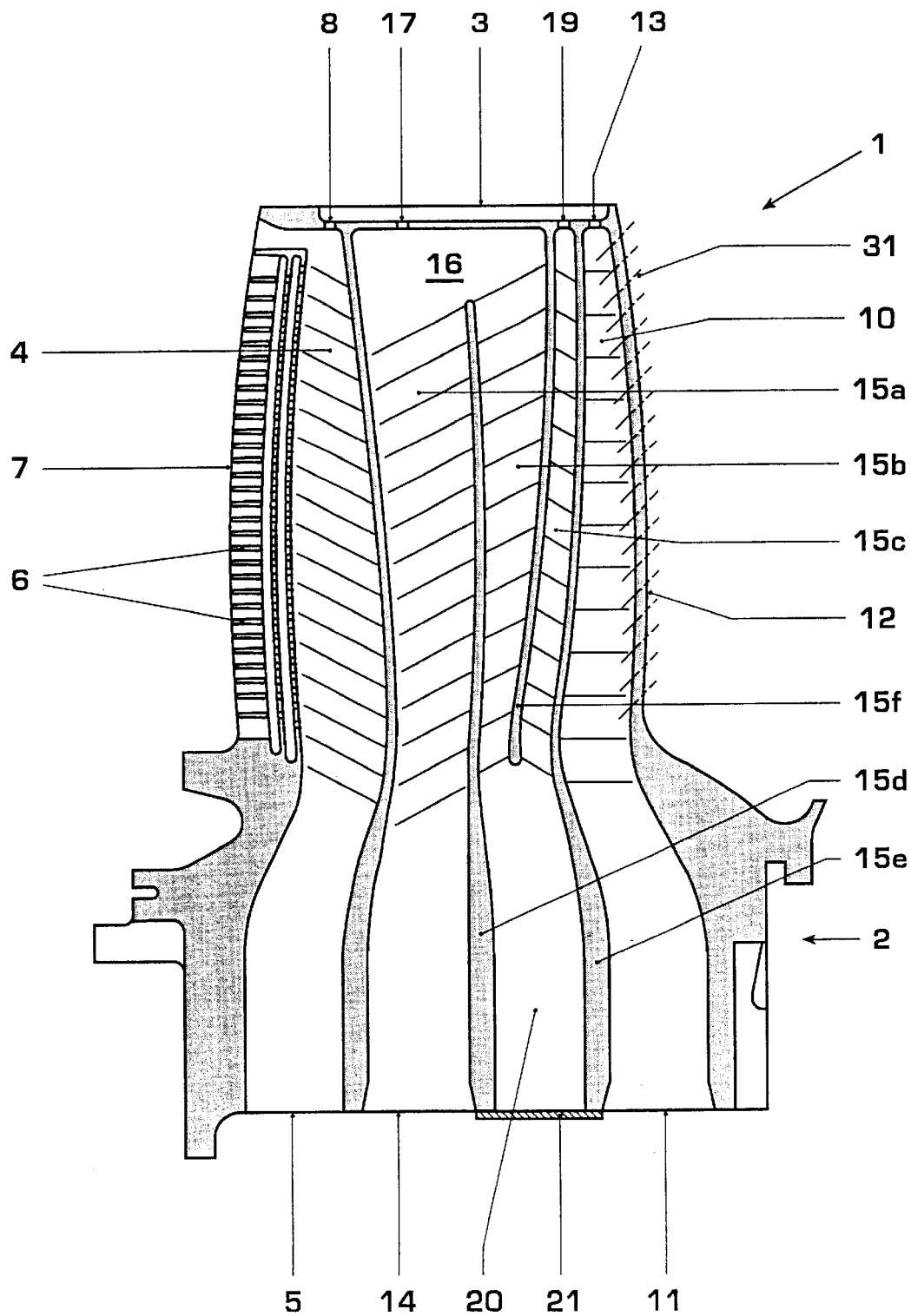
FIG. 2a shows a spanwise cross-section of an airfoil according to the invention with several root turns connecting radially inward extending cooling passages with radially outward extending passages.

FIG. 2a shows an airfoil 1 having some similarities to the conventional airfoil shown in FIG. 1. The airfoil 1 extends from the root section 2 to the tip 3 and comprises several internal passages. A single pass passage 4 extends from the opening 5 for cooling air at the root 2 radially outward to the tip 3. Cooling air can exit through cooling slots 6 along the trailing edge 7 and a tip hole 8. A second single pass passage 10 extends along the leading edge 12 from the entry opening 11 to the tip 3 where it comprises a tip hole 13 for the cooling air.

A three pass serpentine passage is formed by an entry opening 14 for the cooling air at the root of the airfoil, passages 15a and 15b, which are in fluid connection through a first 180° turn 16, and passage 15c, which is in fluid connection with passage 15b through the second 180° root turn 20. The radially inward extending passage 15b is formed by the inner surfaces of the pressure and suction sidewalls of the airfoil, a first wall 15d which separates the passage 15b from the upstream and radially outward extending passage 15a, and finally by a second wall 15f which separates the passage 15b from the downstream and radially outward extending passage 15c.

In accordance with an embodiment of the invention, the 180° root turn 20 extends to the radially inner end of the root section 2 as far as the level of the entry openings 5, 11, and 14. It is formed by the inner surfaces of the suction and pressure sidewalls and the radially inward extensions of the walls 15d and 15e. The radially outward extending passage 15c of the serpentine passage is defined on one side by the sidewall 15e, which separates it from the cooling passage 10.

The ceramic core used for the casting of the airfoil as shown allows for improved precision maintenance of the wall separation during the casting process. Furthermore, the open turn and therefore lack of blind passages allows the use of and easy access for the insertion of additional core supports. The pressure loss around the root turn 20 for this airfoil is approximately the same as that for the conventional airfoil shown in FIG. 1.

After the casting process and the removal of the ceramic core by leaching, firm sheets of Teflon™ or PTFE are inserted as backing material for the laser drilling. The firm Teflon™ sheets provide a greater protection of the airfoil material surrounding the film cooling holes to be drilled compared to the wax material used in current practices.

The root turn 20 is finally closed off by means of an end plate 21, which is welded or brazed to the radially inner end of the passage walls 15d and 15e of the passages 15b and 15c.

Figure 2B:
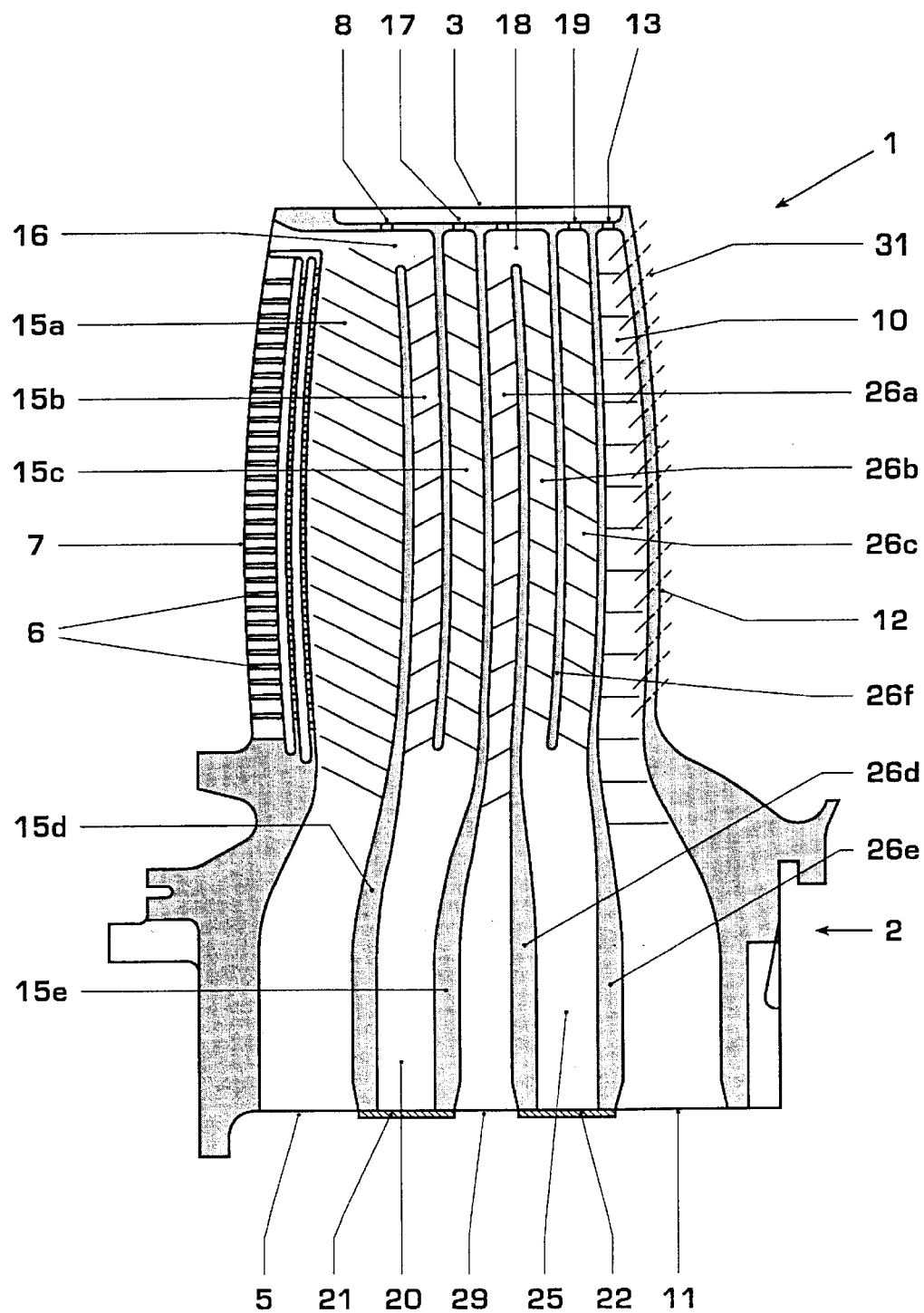
FIG. 2b shows a spanwise cross-section of an airfoil according to the invention with a greater number of internal passages and root turns.

FIG. 2b shows another embodiment of the invention similar to the airfoil shown in FIG. 2a. Like components are represented by the same reference numerals as in FIG. 2a. The airfoil comprises an additional three pass serpentine passage 26a,b,c with walls 26d,e,f, and an additional root turn 25. The first root turn 20 combines the radially inward extending passage 15b and the radially outward extending passage 15c. The second root turn 25 combines the passages 26b and 26c. The root turn 25 is completed by an end plate 22 attached to the radially inner ends of the walls 26d and 26e of the passages 26b and c.

The root turns according to the invention are applicable to not only airfoils with one or more three-pass passages as in FIGS. 2a and 2b, but also to airfoils with five-pass or other multipass passages.

What is claimed is:

1. An airfoil, comprising:

internal cooling air passages arranged in a serpentine manner with one or more radially outward extending passages, one or more radially inward extending passages and turns of approximately 180° by which the radially inward extending passages are in fluid connection with the radially outward extending passages;

in each cooling air passage a radially inward extending passage is defined by the inner surfaces of the pressure and suction sidewalls of the airfoil, a first wall, which separates the radially inward extending passage from a radially outward extending passage that precedes the radially inward extending passage in the direction of the cooling air flow, and a second wall, which separates the radially inward extending passage from a radially outward extending passage that follows the radially inward extending passage in the direction of the cooling air flow;

said radially outward extending passage is defined by the inner surfaces of the pressure and suction sidewalls of the airfoil, the second wall of the radially inward extending passage, and a third wall;

a root turn providing fluid connection between said radially inward extending passage and said following radially outward extending passage in the direction of the cooling air flow is defined by the first wall and the third wall, where the first and third walls extend radially inward to a radially inner end of a root section of the airfoil; and said root turn extends to and is closed off at the radially inner end of the root section by means of a member connecting the ends of the first and third walls, whereby the cooling g air flow reaches to the radially inner end of the root section before traveling through said radially outward extending passage.

2. The airfoil according to claim 1, wherein:

said member is an end plate that is attached to the radially inner ends of the first wall and of the third wall of the serpentine passage.

3. A method of manufacturing the airfoil according to claim 1, wherein the method comprises:

casting the internal cooling air passages using a ceramic core by which means the root turn extending to the radially inner end of the root section of the airfoil is printed out in the casting process, the ceramic material is leached out of the cast airfoil, and strips of polytetrafluoroethylene are inserted into the passages through the open ended root turn, and film cooling holes are formed in a laser drilling process, where the strips of polytetrafluoroethylene provide protection from the laser radiation, and the polytetrafluoroethylene strips are thereafter removed from the internal passages, and an end plate is attached to the radially inner ends of the first and third walls of the internal passages in order to close off the root turn.

4. A method of manufacturing an airfoil comprising internal cooling passages arranged in a serpentine manner with one or more radially outward and radially inward extending passages and turns by which the radially inward extending passages are in fluid communication with the radially outward extending passages, a radially inward extending passage being separated by a first wall from a radially outward extending passage that precedes said radially inward extending passage in the direction of the cooling flow, said radially inward extending passage being separated by a second wall from a radially outward extending passage that follows said radially inward extending passage in the direction of the cooling flow, and said radially inward extending passage being in fluid communication with said radially outward extending passage by means of an open ended root turn, said open ended root turn being defined by said first wall and a third wall of said radially outward extending passage, said first and third walls extending to the radially inward end of a root section of the airfoil, wherein the method comprises:

casting the internal cooling passages using a ceramic core by which means the root turn extending to the radially inward end of the root section of the airfoil is printed out in the casting process;

leaching the ceramic material out of the cast airfoil;

inserting firm strips of polytetrafluoroethylene and core supports into the internal cooling passages through the open ended root turn;

forming film cooling holes using a laser drilling process, with the firm strips of polytetrafluoroethylene providing protection from the laser radiation;

removing the firm strips of polytetrafluoroethylene from the internal cooling passages; and attaching an end plate to the radially inward ends of the first and third walls in order to close off the root turn.

* * * * *